(No Model.)
C. HALSTEAD.
COFFEE OR TEA POT OR URN.
No. 542,731. Patented July 16, 1895.
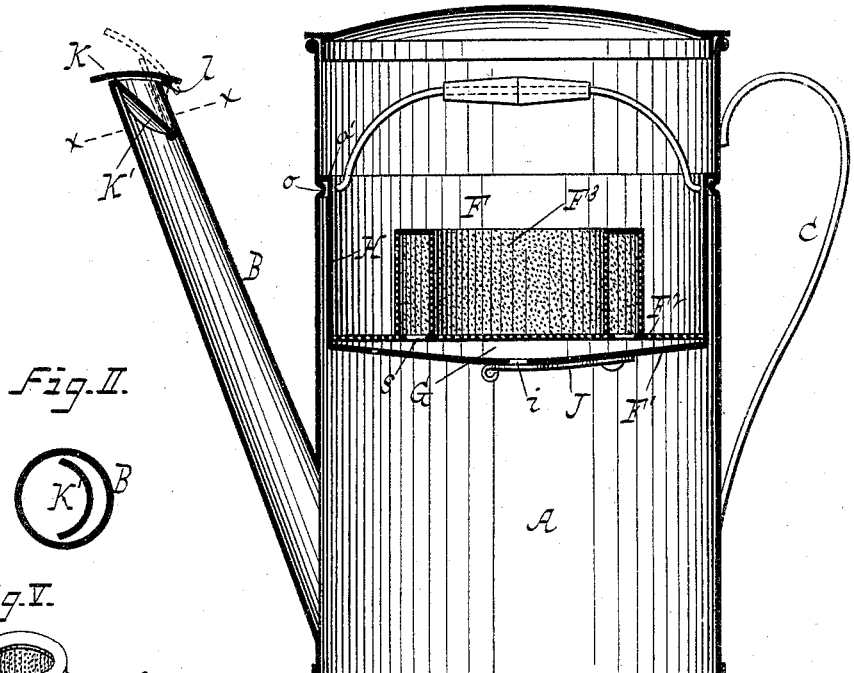
Fig. I.
Fig. II.
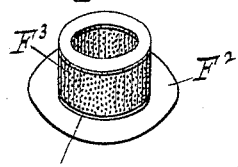
Fig. V.
Fig. III.
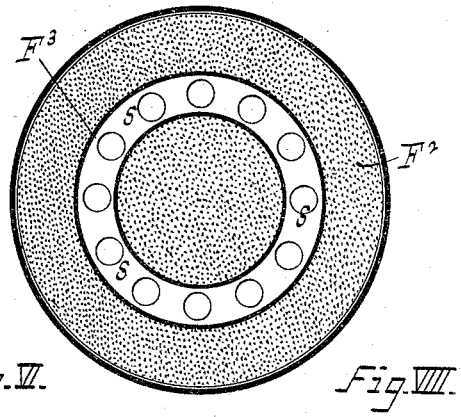
Fig. IV.
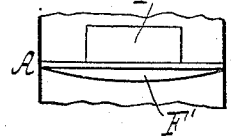
Fig. VIII.
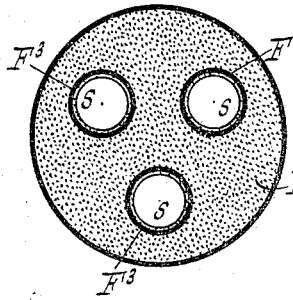
Fig. VI.
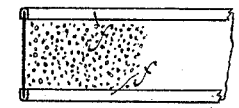
Fig. VII.
WITNESSES:
Chas. Wahlers.
Wm F Tait
INVENTOR
Charles Halstead

UNITED STATES PATENT OFFICE.

CHARLES HALSTEAD, OF BROOKLYN, NEW YORK.

COFFEE OR TEA POT OR URN.

SPECIFICATION forming part of Letters Patent No. 542,731, dated July 16, 1895.

Application filed July 1, 1890. Serial No. 357,383. (No model.)

*To all whom it may concern:*

Be it known that I, CHARLES HALSTEAD, a citizen of the United States, and a resident of Brooklyn, in the county of Kings and State of New York, have invented certain new and useful Improvements in Coffee or Tea Pots or Urns, of which the following is a specification.

My invention relates to improvements in coffee or tea pots and urns with a percolator therein, as shown, for example, in Letters Patent of the United States granted to me May 13, 1890, No. 427,568.

The essential features of my present invention are hereinafter fully described and illustrated in the accompanying drawings, in which—

Figure I represents a vertical central section of a coffee-pot embodying my invention. Fig. II represents a cross-section of the spout on line $x$ $x$ of Fig. I. Fig. III represents an inverted plan view of the percolator. Fig. IV represents a horizontal section thereof. Fig. V represents a perspective view thereof on a reduced scale. Fig. VI represents a horizontal section of a modification thereof. Fig. VII represents a vertical central section of another modification thereof. Fig. VIII represents a detail view of a portion thereof.

Similar letters of reference indicate similar parts.

The letter A indicates the body of the pot, having a spout B, handle C, and lid D of any usual or suitable form.

F indicates a filter or percolator within the pot. This percolator is made with a double bottom, one member F' of which constitutes a main bottom and the other $F^3$ a false bottom, and also with a hollow foraminous body $F^3$ upon said false bottom.

In the main bottom F' are a series of holes or openings $i$ through which the liquid may discharge from the percolator into the pot, and with these holes is combined a gate J, which is common to the series and serves to close one or more of the holes, as desired, with the effect of regulating the flow of liquid from the percolator. In the example shown the gate J is pivoted, as at J', Fig. III, and the discharge-holes $i$ are arranged in an arc of a circle about said pivot.

The false bottom $F^2$ lies above the main bottom F', and the space G between said two parts constitutes a chamber or "trap" for collecting the filtered liquid from the percolator, so that a uniform supply thereof is maintained to the point $i$ of discharge.

The trap-space G is usually created by making the main bottom F' of a concave form and allowing the false bottom $F^2$ to simply rest on the higher part of such concave main bottom, as shown in Fig. I; but, if desired, the main bottom, as well as the false bottom, may be of a plane form, it being only necessary to support the false bottom at a proper distance above the main bottom. When the main bottom F' is concave its point of discharge $i$ should be at the lower central part thereof, as shown, in order to afford a proper escape to the liquid, since it tends to flow toward that part.

The foraminous body $F^3$ of the percolator may be composed of a hollow wall of annular or ring shape, as in Figs. I, IV, and V, or of a cylinder or cylinders, as in Fig. VI, or it may be of any other approved figure, the material used in its structure being wire-gauze or of a similar nature. Said percolator-body $F^3$ has an outlet $s$ through its supporting base or bottom, affording a proper communication thereof with the trap-space G, and when the body is composed of an annular hollow wall said outlet is usually formed by holes (one or more) between the parallel sides of such wall, as more clearly shown in Fig. IV, while when the body is composed of a cylinder the outlet is formed by a hole at a point inside of the cylinder, as shown in Fig. VI.

The hollow wall of annular shape forming the percolator-body, as in Figs. I, IV, and V, has the advantage of presenting a double filtering surface with each of its parts or members continuous and independent of the other, thereby enlarging the effective area of the percolator with economy of space, and also of permitting the coffee to be introduced in the space within the wall as well as around it, and said shape of the wall is an important feature of my invention.

When the hollow body $F^3$ has its parts made of gauze the edges of this material are bound with strips $f$, Figs. V and VIII, of sheet metal, which are bent to an approximately U shape and compressed on said edges. These binding-strips $f$ act as a support for the wire-gauze in shaping it to the configuration of the hollow body F³ and firmly hold it in the desired shape, while they also afford a ready and practical means for soldering the gauze structure to adjacent parts, as to its supporting-base, and due to the U shape of said strips they are firmly held in position upon the edges of the gauze by being simply compressed thereon without the use of solder or other extraneous fastenings for that purpose.

In order to increase the filtering-surface of the percolator the false bottom F² is perforated, as shown in Figs. I, IV, and VI; but, if desired, it may be left solid, as shown in Fig. V, and substituted for the main bottom.

Referring to Fig. I, the percolator F is combined with a coffee-receptacle H, of which the main bottom F' is a constituent part, and which rests on an internal bead o of the pot by a flange o' at its upper edge. This receptacle H, however, may be omitted, and in that event the percolator is simply fitted into the pot, as by the periphery of the main bottom F', as shown in Fig. VII, one effect of which is to render the percolator adjustable to different heights.

The spout B of the pot has a lid or cap K for preventing escape of vapor by closing the mouth of the spout. This cap K is usually hinged at one edge l, so as to swing in vertical direction, and within the spout B is a lever K', operating to automatically lift said cap from a closed to an opened position. This lifting-lever K' is pivoted to the spout at a suitable point to bring the free end thereof approximately on a level with the mouth of the spout, as shown in Fig. I, causing said lever to lift and act as a rest for the cap, and the intermediate portion of the lever is segmental in cross-section, thereby conforming to the interior of the spout, as more clearly shown in Fig. II. When the cap K is closed the lifting-lever K' lies in an inclined position across the spout and tends to interrupt the flow of liquid therefrom, especially by reason of its shape, while if the pot is now tilted for discharging the liquid said lever yields to the pressure of the liquid and is thereby thrown outward or upward, so as to displace the cap, as indicated by dotted lines in Fig. I.

If desired, the cap K may be firmly connected to the lifting-lever K', it being in that event left disconnected from the spout, and the lever, moreover, may be used independently of the cap, since it also acts as a valve.

What I claim as new, and desire to secure by Letters Patent, is—

1. A coffee pot having a separate coffee receptacle therein, provided with false and main bottoms, having an intervening chamber, a percolator on said false bottom and a gate for said main bottom, said parts being combined substantially as described.

2. In a coffee pot a percolator, having a hollow body of foraminous material and a base or bottom with a liquid chamber between its upper and lower member and a discharge outlet between the walls of said body into said chamber with an outlet in its lower member substantially as and for the purpose described.

3. In a coffee pot, a separate coffee receptacle, a foraminous percolator thereon having a chamber between the double bottom thereof, the said bottom consisting of an upper false member and a lower true member, said false member being percolate, and the true member having openings with a common gate, said parts being combined substantially as described.

4. A percolator having a hollow foraminous wall of annular shape, and a supporting base or bottom with an outlet between the sides of said wall, substantially as and for the purpose described.

5. In a coffee pot, a spout having a cap, and a lifting lever within the spout conforming in cross section to the interior thereof, for automatically adjusting said cap, substantially as shown and described.

CHARLES HALSTEAD.

Witnesses:
 CHAS. WAHLERS,
 WM. F. VAIL.